United States Patent [19]

Demarest et al.

[11] Patent Number: 5,722,199
[45] Date of Patent: *Mar. 3, 1998

[54] FLEA TRAP

[75] Inventors: Scott W. Demarest, Racine, Wis.; William J. Mayer, South Barrington; Dennis W. Gruber, Arlington Heights, both of Ill.; Donald E. McCumber, Madison, Wis.; Joseph E. Reimer, Oregon, Wis.; Karl A. Kohler, Racine, Wis.

[73] Assignee: S. C. Johnson & Son, Inc., Racine, Wis.

[*] Notice: The term of this patent shall not extend beyond the expiration date of Pat. No. 5,513,465.

[21] Appl. No.: 729,201

[22] Filed: Oct. 15, 1996

Related U.S. Application Data

[63] Continuation of Ser. No. 325,915, Oct. 19, 1994, abandoned, which is a continuation-in-part of Ser. No. 168,432, Dec. 17, 1993, Pat. No. 5,513,465.

[51] Int. Cl.$^6$ ............................................. A01M 1/04
[52] U.S. Cl. ..................................... 43/113; 43/114
[58] Field of Search ............................ 43/113, 114, 115, 43/116, 117

[56] References Cited

U.S. PATENT DOCUMENTS

| Re. 34,402 | 10/1993 | Williams | 43/113 |
|---|---|---|---|
| 389,482 | 9/1888 | Owens . | |
| 670,996 | 4/1901 | Morgan . | |
| 1,701,674 | 2/1929 | Hitosi . | |
| 1,820,813 | 8/1931 | Loomis . | |
| 3,023,539 | 3/1962 | Emerson . | |
| 4,086,721 | 5/1978 | Deas | 43/113 |
| 4,127,961 | 12/1978 | Phillips | 43/139 |
| 4,332,100 | 6/1982 | Schneider | 43/113 |
| 4,366,643 | 1/1983 | Boaz | 43/113 |
| 4,566,220 | 1/1986 | Justice | 43/113 |

(List continued on next page.)

FOREIGN PATENT DOCUMENTS

72368 4/1993 Canada .
458659 10/1913 France .

OTHER PUBLICATIONS

L. G. Pickens, J. F. Carrpoll & A. Farhang Azad, *Electrophysiological studies of the spectral sensitivties of cat fleas, Ctenocephalides felis, and oriental rat fleas, Xenopsylla cheopis to monochromatic light*, Entomol. ext. appl 45; 193–204, 1987.

Advertisement for "*The Original Flea & Insect Trap*", date uncertain.

Weste L. A. Osbrink and Michael K. Rust, *Cat Flea (Siphonaptera: Pulicidae): Factors Influencing Host–Finding Behavior in the Laboratory*, Ann. Entomol. Soc. Am 78: 29–34 (1985).

G. E. Crum, F. W. Knapp and G. M. White, *Response of the Cat Flea, Ctenocephalides Felis (Bouche), and the Oriental Rat Flea, Xenopsylla Cheopis (Rothchild), to Electromagnetic Radiation in the 300–700 Nanometer Range*, Mar. 28, 1974. J. Med. Eng. vol. 11. No. 1:88–84.

Advertisement for "*The Terminator*" *Flea Trap* as appeared in USA Weekend, p. 5, May 14–16, 1993.

Product information pages from BioCare Products, Ltd., date uncertain.

Advertisement for "*Flea Beacon*" flea trap, date uncertain.

*Primary Examiner*—Kurt Rowan

[57] ABSTRACT

A flea trap including a horizontally oriented base and a vertically oriented cover, the cover extending upwardly from the rear edge of the base, and the base extending forwardly from the bottom edge of the cover. The base has a horizontal insert tray slot adapted to receive an insert tray that has a tacky upper surface. The insert tray slot has an upwardly opening tray slot window, through which fleas may fall to land on the tacky surface, and access means for the insertion and removal of the insert tray. The cover has a light source with means to direct the light substantially forwardly, across the base, toward the area in front of the flea trap.

44 Claims, 6 Drawing Sheets

U.S. PATENT DOCUMENTS

| | | | |
|---|---|---|---|
| 4,654,998 | 4/1987 | Clay | 43/113 |
| 4,686,789 | 8/1987 | Williams | 43/113 |
| 4,700,506 | 10/1987 | Williams | 43/113 |
| 4,918,856 | 4/1990 | Olive et al. | 43/113 |
| 4,959,923 | 10/1990 | Aeillo et al. | 43/112 |
| 4,979,329 | 12/1990 | Olive et al. | 43/113 |
| 5,044,112 | 9/1991 | Williams | 43/113 |
| 5,142,815 | 9/1992 | Birdsong | 43/113 |
| 5,184,417 | 2/1993 | Weldon | 43/107 |
| 5,203,816 | 4/1993 | Townsend | 43/114 |
| 5,205,064 | 4/1993 | Nolen | 43/112 |
| 5,231,790 | 8/1993 | Dryden et al. | 43/113 |
| 5,311,696 | 5/1994 | Gauthier et al. | |

FLEA TRAP

This application is a continuation of application No. 08/325,915 filed Oct. 19, 1994, now abandoned, which was a continuation-in-part of application Ser. No. 08/168,432, filed Dec. 17, 1993, now issued as U.S. Pat. No. 5,513,465.

BACKGROUND OF THE INVENTION

1. Field of the Invention

The present invention relates generally to the field of flea traps designed for use in and around areas where fleas have become established in carpets, furniture, or on animals such as dogs and cats. More particularly, the invention relates to flea traps of the sort that seek to attract fleas by means of a light and then to trap them in order to kill or remove them.

2. Description of the Prior Art

The art is generally aware of the use of light to attract fleas. Frequently, green light is specified as that most attractive to fleas. Examples include Williams, U.S. Pat. No. 4,686,789; Williams U.S. Pat. No. 4,700,506; Williams, U.S. Pat. No. 5,044,112, Olive, et al, U.S. Pat. No. 4,918,856, and Birdsong, U.S. Pat. No. 5,142,815. Dryden, et al, U.S. Pat. No. 5,231,790 disclose the further attractive value of periodic interruptions in the light.

Once the fleas are attracted, the prior art flea traps typically trap them in a sticky substance, whether a liquid in a pan or the tacky surface of fly paper or other comparable material. A common arrangement is to have the light source of the flea trap suspended above a tacky surface, with the light directed downwardly toward the surface. However, with variations, Dryden, et al, the Williams '112 patent, and Olive all show vertically arrayed tacky surfaces around, beneath, or behind a light source. There are a number of examples in the art of each of these features. The particular art cited is simply illustrative.

Although the light source of some of these flea traps is so arranged as to be visible from in front of the trap, no affirmative effort is taken to cause the light to be projected forwardly. Consequently, because fleas are attracted by actually seeing the light and by the intensity of the light seen, some of the beneficial value of conventional light sources is lost by this failure to project the light out into a room, where fleas may observe it. Furthermore, because it is common for users to place a flea trap against the wall of a room, where the trap will be less likely to obstruct traffic or be disturbed by pets, part of the light of most conventional flea traps is effectively directed toward a wall or furniture, where it is absorbed and therefore wasted without good effect.

The sticky materials used to actually catch fleas have the potential of being messy or difficult to deal with. Liquids can spill, of course. But even tacky-surfaced paper can be a source of misery for the pet who unsuspectingly brushes up against it. Such a pet can easily disable the trap and end up with paper stuck firmly to its fur. The paper must then either be cut away or pulled off, with pain to the pet and loss of fur.

Clay, U.S. Pat. No. 4,654,998 is an example of traps that protect a sticky-surfaced material from pets, children, or the like by placing the material behind a screen. A flea trap advertised by BioCare Products, Ltd. of Victoria B.C., Canada, includes a light mounted in a rigid frame over a horizontal pad of sticky material that is held within a platform that projects outwardly from under the light. A grid attaches to the platform and extends over the sticky pad, protecting it from animals or children. The grid is designed to be removed temporarily from the device to provide access to the sticky material for its removal. Once the sticky material is renewed by replacing a sheet of fly paper or the like, the grid is reinserted, and the spent fly paper is thrown away. Many of the prior art devices, comparably to the BioCare product, require some disassembly of the trap to allow access to the sticky surface for replacement, especially if the surface is protected by a grid or screen.

Other art exists that shows parallel developments in traps designed to deal with other insect pests. For example, Aiello, U.S. Pat. No. 4,959,923, Phillips, U.S. Pat. No. 4,127,961, and Schneider, U.S. Pat. No. 4,332,100 all show insect-attracting lights so arranged as to project the light forwardly from the trap. Schneider and Phillips both show means for forcibly directing attracted insects downwardly to contact a liquid or tacky surface for holding or trapping the insects. Phillips discloses use of a tacky, flexible, fly paper-like material, panels of which can be replaced as they fill with insects. In Schneider, the insects are swept downwardly and backwardly under the light source by a stream of air that urges the swept insects against a pool of water that is held within a removable tray. The insects are disposed of by dumping out the water. Neither Phillips nor Schneider, with their forced air flow, are particularly adapted for a floor level installation, such as that desirable for flea traps.

In general, the traps of the prior art tend not to have convenient and sanitary means for disposing of trapped fleas while simultaneously protecting the sticky material or tacky surface on which the fleas are trapped from contact with pets or children. Furthermore, these devices do not provide for the convenient and reliable closure of a trap into a compact form desirable for shipping, stocking on a store shelf, moving from room to room, or closing temporarily for aesthetic reasons, when a user desires to avoid the open display of trapped fleas or an active flea trap.

SUMMARY OF THE INVENTION

The present invention is summarized in that a flea trap is disclosed having a horizontally oriented base that has a front and a rear edge. A vertically oriented cover has a bottom and a top edge, the cover extending upwardly from the rear edge of the base, with the base extending forwardly from the bottom edge of the cover. The base has internal surfaces defining a substantially horizontal insert tray slot adapted to receive an insert tray. The insert tray slot has an open top defining a tray slot window and an open side defining an insert port. The insert port is sufficiently large to allow the horizontal insertion and removal therethrough of an insert tray. The cover has a light source whose light is directed substantially forwardly, across the base, toward the area in front of the flea trap.

The invention is further summarized in that a flea trap is disclosed having a horizontally oriented base with a front and a rear edge, a vertically oriented cover with a bottom and a top edge, and an insert tray. The cover extends upwardly from the rear edge of the base, and the base extends forwardly from the bottom edge of the cover. The base has internal surfaces defining a substantially horizontal insert tray slot adapted to receive the insert tray. The insert tray slot has an open top defining a tray slot window and an open side defining an insert port. The insert port is sufficiently large to allow the horizontal insertion and removal of the insert tray through the insert port. The base also has a protective grid, the grid having spaced grid members that extend over the tray slot window. The grid members are spaced sufficiently close to each other as to restrict pet or child access through the grid to the insert tray slot but sufficiently apart from each other as to allow fleas access to the insert tray slot. The cover has a light source whose light is directed substantially forwardly, across the base, toward the area in front of the flea trap. The rear edge of the base and the bottom edge of the cover are joined to each other in jointed relation such that the cover may be moved by a user of the flea trap from an open position, wherein the cover extends approximately at a right angle to the base, to a closed position, wherein the cover extends generally parallel to the base to substantially cover the tray slot window. The insert tray has an upwardly exposed tacky surface to retain those fleas that are attracted to the flea trap by the light source and fall through the tray slot window to the tacky surface.

The method of the invention is summarized in that a method of trapping fleas includes the steps of placing a horizontally oriented tacky surface at a location at which the fleas are to be trapped, and projecting generally horizontally directed light from a selected light source forwardly from the rearward edge of the tacky surface in order to attract fleas toward the light. The light source has a vertically oriented, forwardly facing illuminating surface that extends for substantially the width of the tacky surface. By this method, fleas attracted by the light will jump toward the light source and onto the tacky surface or will jump against the forwardly facing illuminating surface to bounce back therefrom onto the tacky surface, to be held and so trapped by the tacky surface.

The insert tray of the invention is summarized in that an insert tray is disclosed for removable insertion into an insert tray slot that has keying structures that impart a cross-sectional profile to the insert tray slot to restrict access thereinto. The insert tray has structures that define a cross-sectional profile complementary to that of the insert tray slot, including a curved central panel having an upwardly exposed tacky surface.

DETAILED DESCRIPTION OF THE PREFERRED EMBODIMENT

Figure 1:
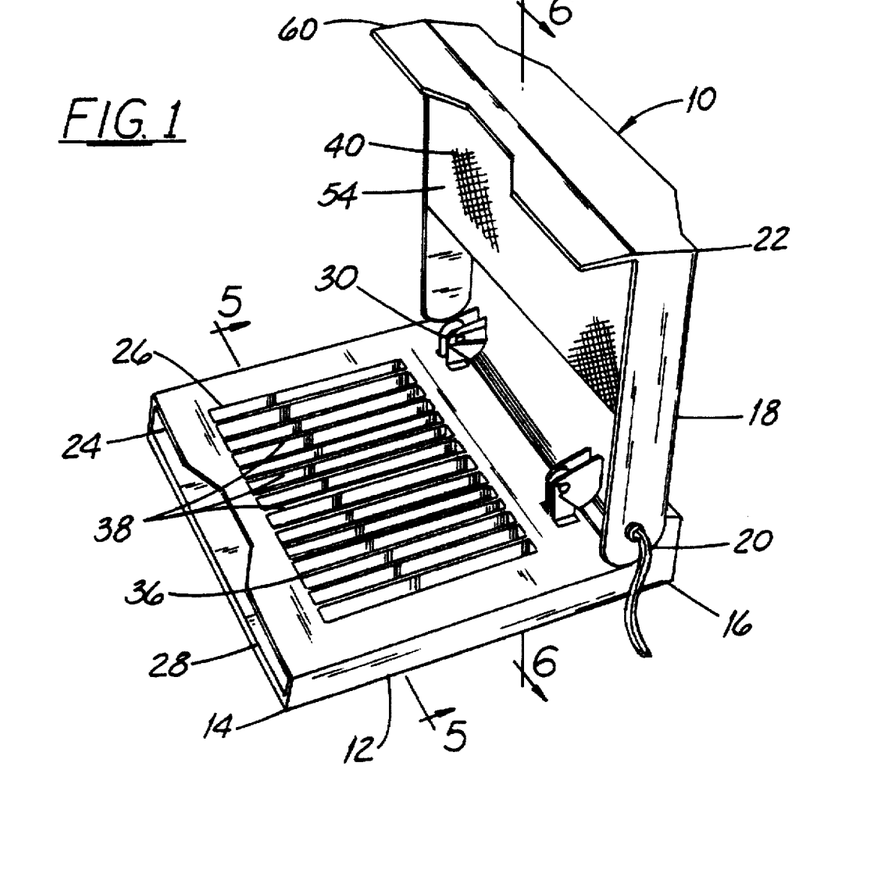
FIG. 1 is a front perspective view of the preferred embodiment of the flea trap of the invention, with the cover in an open position.

Turning now to the drawings, wherein like parts are indicated by like reference numbers, a first and preferred embodiment of the flea trap of the invention is shown generally in FIG. 1 at 10. The flea trap 10 includes a horizontally oriented base 12 having a front edge 14 and a rear edge 16. A vertically oriented cover 18, having a bottom edge 20 and a top edge 22, extends upwardly from the rear edge 16 of the base 12. The base 12 thus extends forwardly from the bottom edge 20 of the cover 18.

The base 12 has internal surfaces defining a substantially horizontal insert tray slot 24 adapted to receive an insert tray, to be discussed below. The insert tray slot 24 has an open top defining an upwardly open tray slot window 26 and access means for the insertion and removal of an insert tray in the insert tray slot. The tray slot window 26 itself may serve as such access means, with the insert tray being introduced into the insert tray slot 24 from above. An opening in the base 12 sufficient for insertion of the insert tray from below is also possible. However, in the preferred embodiment of the invention, the insert tray slot 24 has an open side defining an insert port 28, and the insert port is sufficiently large to allow the horizontal insertion and removal of an insert tray therethrough. Preferably, the insert port 28 opens forwardly, through the front edge 14 of the base 12.

Figure 2:
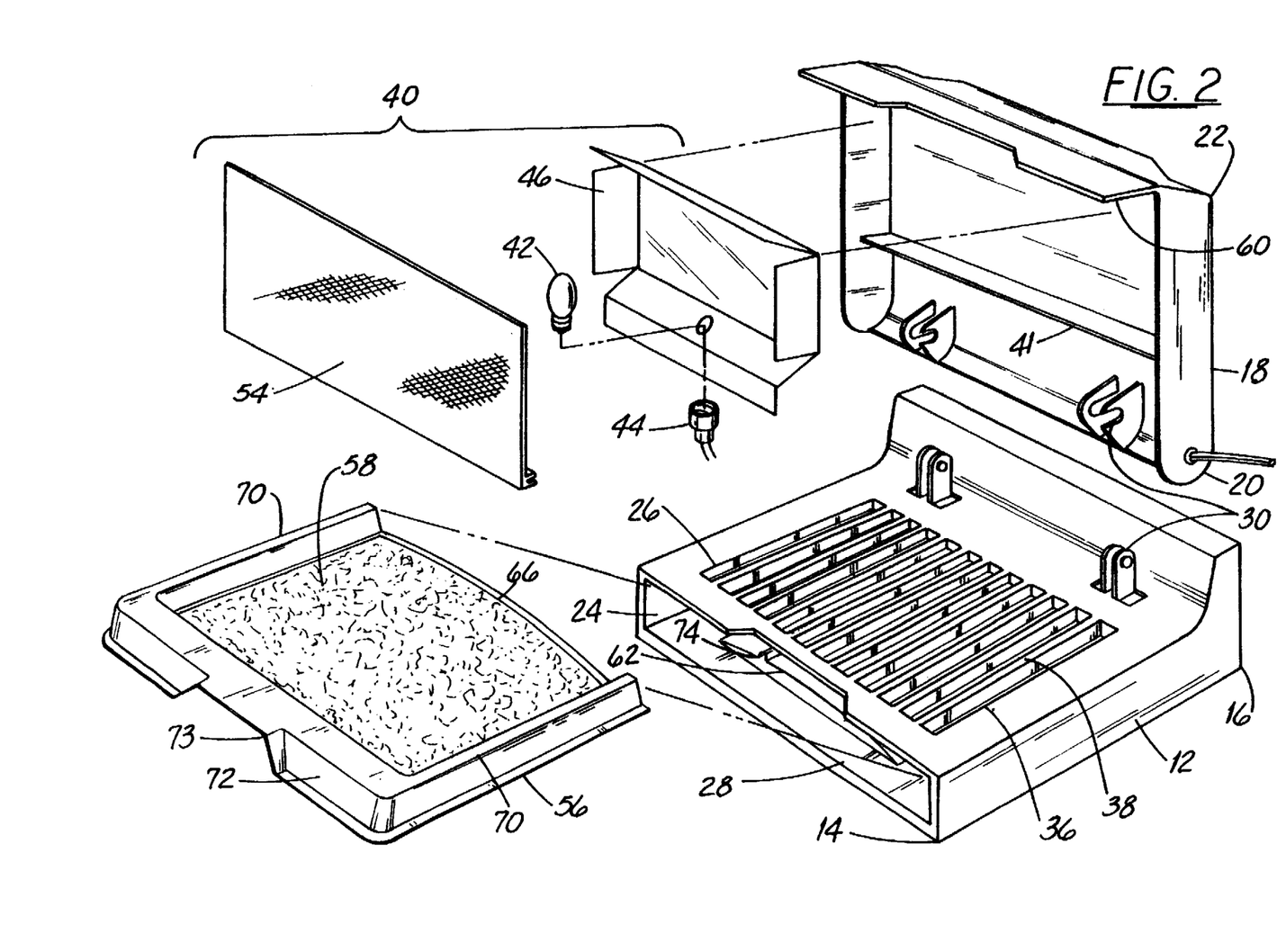
FIG. 2 is the flea trap of FIG. 1, exploded to show the relationship of its parts.
Figure 3:
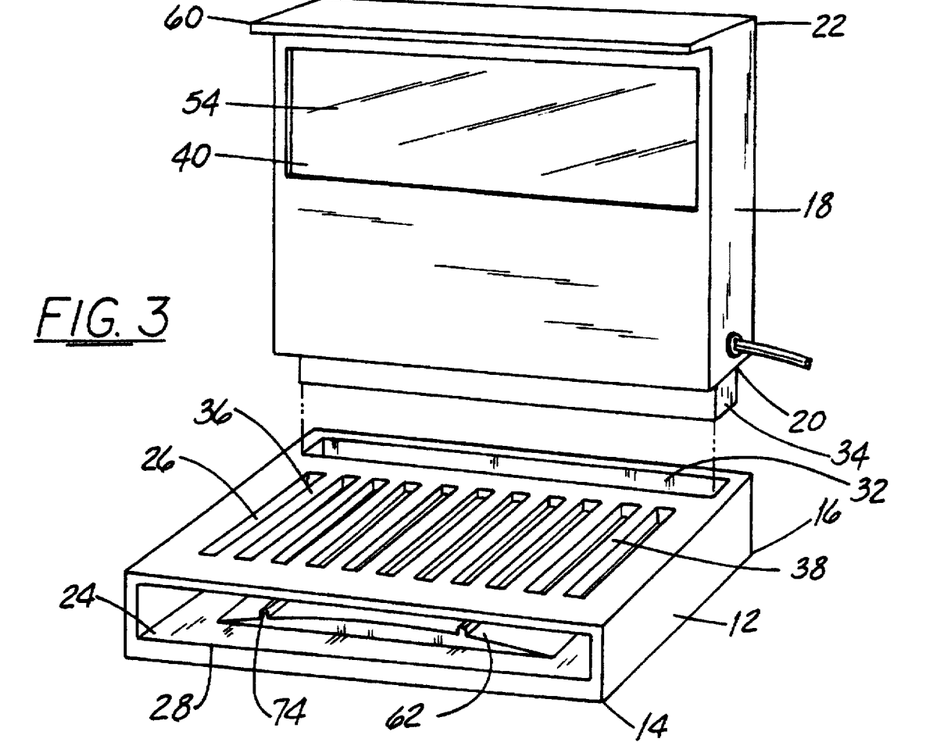
FIG. 3 is an alternative embodiment of the invention, the cover and base shown separated from each other.
Figure 4:
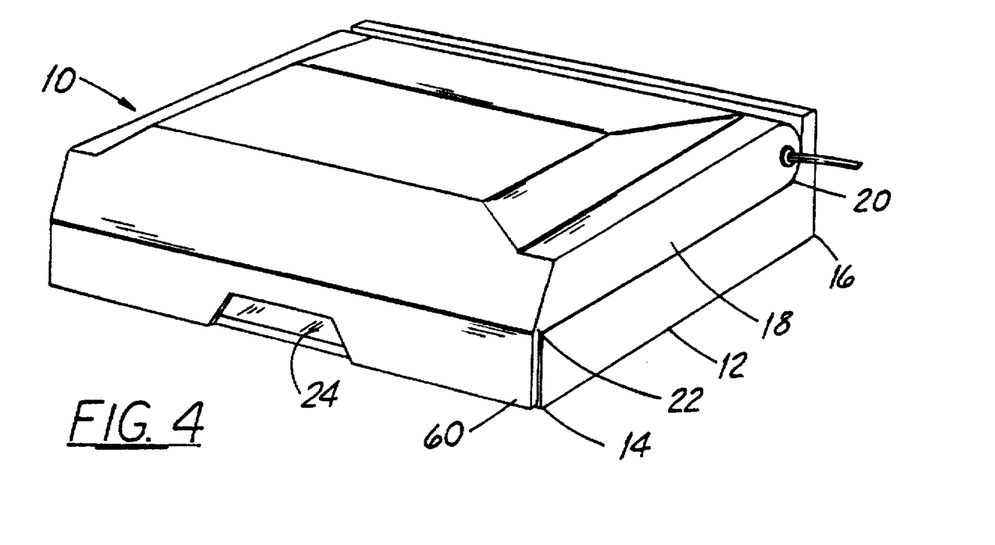
FIG. 4 is the flea trap of FIG. 1 in its closed position.

The rear edge 16 of the base 12 and the bottom edge 20 of the cover 18 are joined to each other, preferably in a jointed relation such that the cover may be moved by a user of the flea trap 10 from an open position, wherein the cover extends approximately at a right angle to the base, to a closed position, wherein the cover extends generally parallel to the base to substantially cover the tray slot window 26. In the preferred embodiment of the invention, the base 12 and cover 18 are joined by a hinge 30, as is shown in FIGS. 1 and 2. However, alternative means will be apparent by which the base 12 and cover 18 may be so joined as to allow the cover to be moved to a closed position. For example, an alternative embodiment shown in FIG. 3 includes a joint slot 32 located in either the rear edge 16 of the base 12 or the bottom edge 20 of the cover 18. A joint tab 34 is then provided in the other of the rear edge 16 of the base 12 or the bottom edge 20 of the cover 18. The joint tab 34 is so adapted in shape, size, and orientation as to be releasably retained within the joint slot 32 when the cover 18 is in its open position. A user may disengage the joint tab 34 from the joint slot 32 and then place the cover 18 horizontally over the base 12 to move the cover to its closed position. Alternatives to the hinge or the slot and tab systems described will be apparent to one skilled in the art, including flexible members joining the base and cover, and the like.

The base 12 further includes a grid 36 made up of spaced grid members 38 that extend over the tray slot window 26. The grid members 38 are spaced sufficiently close to each other as to restrict pet or child access through the tray slot window 26 to the insert tray slot 24, beneath. However, the grid members 38 are spaced sufficiently apart from each other as to allow fleas access to the insert tray slot 24. Preferably, for safety and reliable functioning, the grid 36 is non-removably incorporated into the base 12. When the flea trap is made of molded plastic, as is preferred, it is practical to unitarily mold the base 12 and grid 36. By this means, the strength of the grid 36 is enhanced and the possibility of accidental or unauthorized removal of the grid is avoided.

The cover 18 includes a light source 40 whose light is directable substantially horizontally and forwardly, across the base 12 and toward the area in front of the flea trap 10. It is preferred that the light source 40 emit a green light of the sort recognized by the art as effective in attracting fleas. Furthermore, it is advantageous that the light of the light source 40 be intermittent, with the flea-attracting advantages discussed in Dryden et al., U.S. Pat. No. 5,231,790.

The light source 40 is located within the cover 18, facing forwardly toward the base 12 when the cover is in its open position. In the preferred embodiment of the invention, the cover 18 has a support shelf 41 that is attached to and extends forwardly from a forwardly facing surface of the cover. The various parts of the light source 40, as described below, may be attached directly to the cover 18 or the support shelf 41 or both by any conventional means of attachment. The support shelf 41 may be unitarily molded as a part of the cover 18 if the cover is made of plastic.

Figures 6, 7:
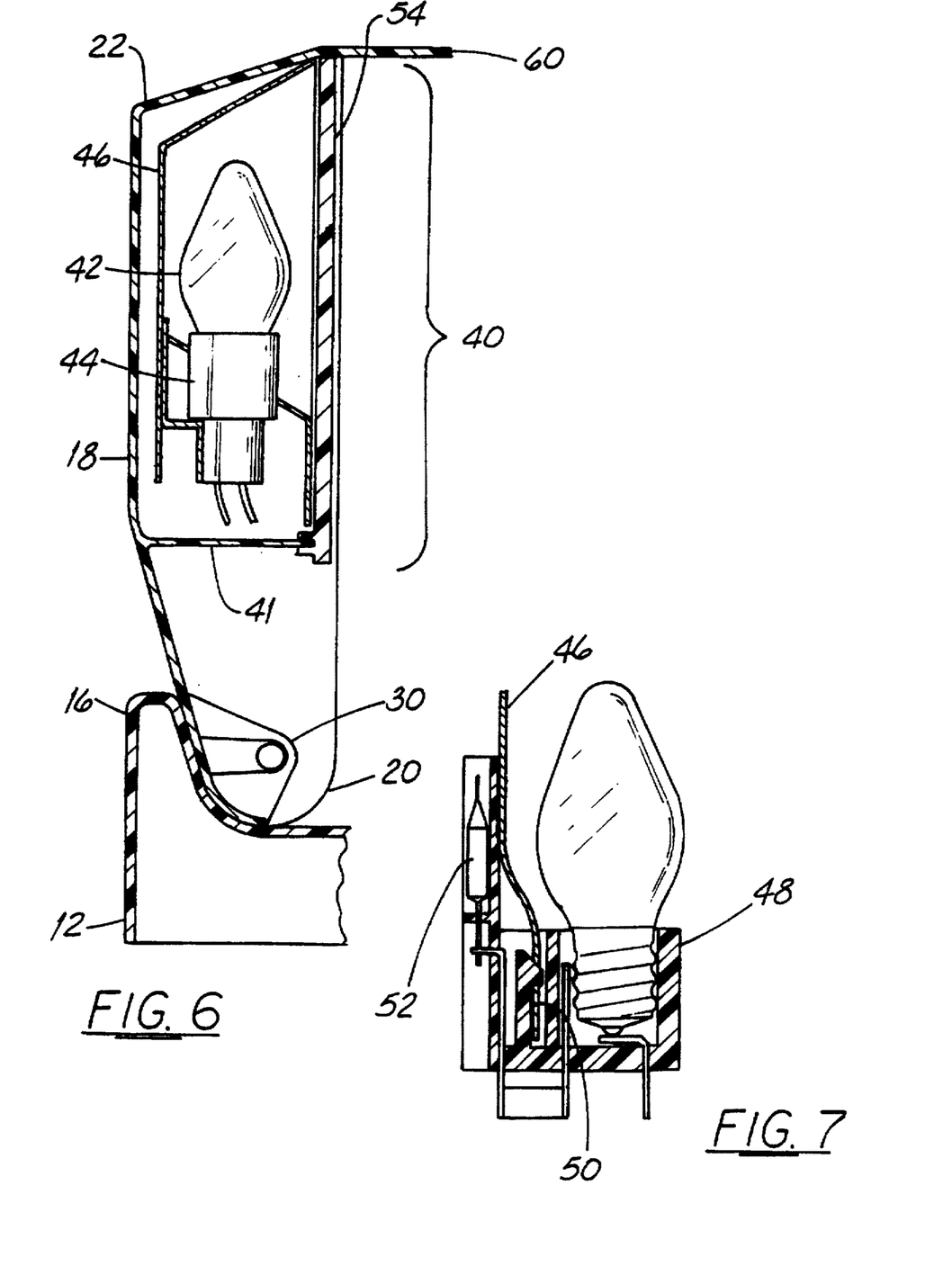
FIG. 6 is a cross-sectional view of the flea trap of FIG. 1 taken along section line 6—6 of FIG. 1, with a portion of the base broken away.
FIG. 7 is a cross-sectional view of a light bulb holder, corresponding in direction of view to FIG. 6 but showing structure alternative to that shown in FIG. 6.

The light source 40 preferably includes a conventional incandescent light bulb 42 and means to direct electricity thereto, such as the conventional socket and cord assembly shown at 44 in FIGS. 2 and 6. The light source 40 further includes a reflector 26 positioned behind the light bulb 42. Although reflective surfaces serving as the reflector may be directly applied to or formed as a part of the cover 18, itself, the separate reflector structure shown in the Figures is preferred. Such a reflector 26 serves to protect the cover 18 from the effects of the heat generated by the light bulb 42. Whether a separate reflector structure or otherwise, taken alone or in conjunction with the lens to be described below, the reflector 26 provides means to affirmatively direct the light of the light source 40 substantially forwardly, across the base, toward the area in front of the flea trap.

Figure 8:
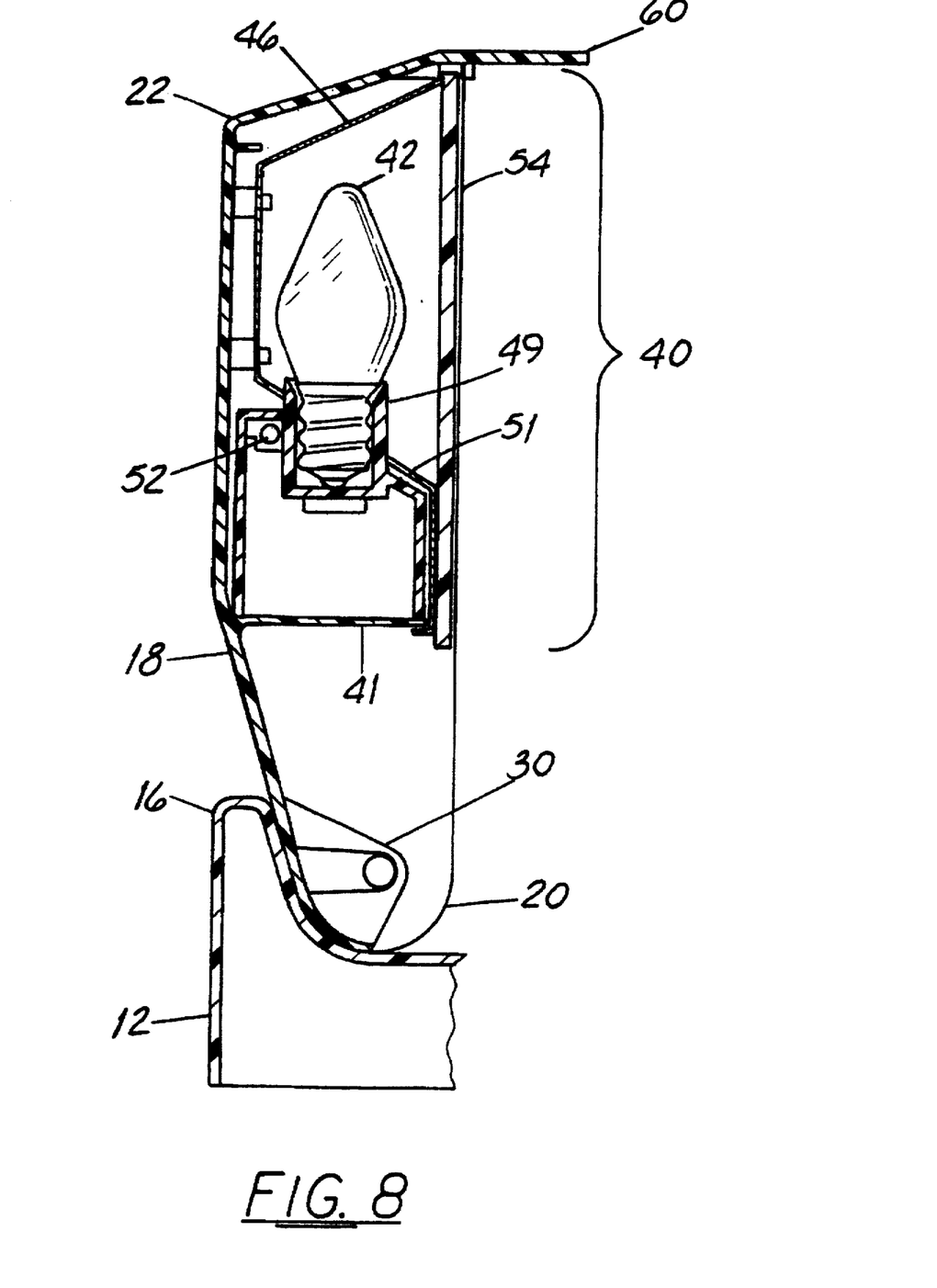
FIG. 8 is a cross-sectional view of yet another light bulb holder alternative in structure to those shown in either FIG. 7 or FIG. 6, FIG. 8 corresponding in direction of view to FIG. 6.

Arrangements other than the conventional socket and cord assembly 44 are also possible. For example, it is convenient and economical for manufacture and assembly to design a unitarily molded socket assembly, such as the first version shown at 48 in FIG. 7 or the preferred, alternative version shown at 49 in FIG. 8. The molded socket assembly 48 is adapted to be snapped to the reflector 46, and to that end includes an engagement member 50 adapted to snap into an appropriate dimple or opening of the reflector in a conventional manner. The alternative molded socket assembly 49 shown in FIG. 8 is attached directly to forwardly facing surfaces of the cover 18 or to the support shelf 41 by a thermally created bond, glue, or any conventional means for attachment. The light bulb 42 of the alternative molded socket assembly 49 is inserted into the socket assembly through an opening 51 provided for the purpose in the reflector 46.

The preferred embodiment of the invention also includes a temperature responsive fuse, shown at 52 in FIGS. 7 and 8, respectively the first and alternative versions 48 and 49 of a unitarily molded socket assembly. The temperature responsive fuse 52 is located at any appropriate place within the cover 18 and is adapted to interrupt the flow of electricity to the light bulb 42 when the temperature experienced by the fuse exceeds a pre-selected level. The fuse 52 thus constitutes temperature responsive means to interrupt the flow of electricity to the light bulb 42. A temperature sensing switch or other functional alternatives to the fuse 52 will be apparent to one skilled in the art and are within the scope and breadth of the invention. The fuse 52 is a safety measure that lessens the danger of fire or damage to the flea trap 10 from overheating, whether caused by misuse of the trap or otherwise. Although the temperature responsive means illustrated is incorporated within the molded socket assemblies 48 and 49, clearly such means could be incorporated with the socket and cord assembly 44 or other conventional means of supplying electricity to the light bulb 42.

Although the incandescent light bulb 42 is preferred for its simplicity and economy, any means to supply light of a sufficient intensity may be used, including fluorescent lights, arrays of LEDs, chemical or battery powered light sources, and the like. All such alternative light sources are within the scope and breadth of the invention.

The light source 40 further includes a light-transmitting lens 54. The lens 54 is located forward of the light bulb 42 and extends from side to side of the cover 18 for substantially the width of the tray slot window 26. Among other functions, the lens 54 serves to protect children or animals from unintentional contact with a hot light bulb 42 and also helps to protect the bulb from breakage.

The lens 54 preferably includes a conventional prismatic pattern (not shown) molded into the lens surface facing toward the cover 18 and thus toward the light bulb 42. By combination of the reflective surface of the reflector 46 and such a prismatic lens pattern or alternative means in the lens or reflector to modify the pattern of directed light, the light source 40 includes means to direct the light predominately forwardly from the cover 18 and to distribute the light of the light bulb 42 horizontally so as to achieve a nearly 180° horizontal spread of the light. This directional concentration of the light extends the effective illumination range of the light bulb 42.

It is preferred that the lens 54 present a smooth surface forwardly toward the base 12. The advantages of such a surface for cleaning will be apparent. However, beyond that advantage, when fleas are attracted by the light of the light bulb 42, they jump toward it. The lens 54 provides an effective backboard against which they bounce to fall back into the tray slot window 26. By allowing the lens 54 to extend substantially the full width of the tray slot window 26, as is preferred, the ability of the flea trap 10 to collect fleas is enhanced. Nevertheless, the use of a lens 54 less wide or, indeed, the use of no lens at all remains within the scope and breadth of the invention.

The discovery by Dryden et al., U.S. Pat. No. 5,231,790, of the flea-attracting effects of a light source of intermittent intensity has been referred to, above. The present inventors have discovered that similar flea-attracting effects may be accomplished by causing the highest region of intensity of the light directed forwardly by the light source 40 to sweep like a searchlight beam across the area to be illuminated, an effect that shall be referred to herein as sweeping the target area with light. Means for sweeping the target area with light may include an oscillating reflector located behind the bulb 42 or a mechanism for moving the bulb and the lens 54 relative to each other, if the lens 54 includes the preferred prismatic or other light directing pattern referred to, above. The movement of the lens 54 relative to the bulb 42 may be horizontal, vertical, radial, or any combination of such or other movements that cause variation in the light directed to the different parts of the target area. Such reflector or bulb/lens movement may be achieved by use of a motor and cam-driven mounting (not shown) for such a reflector or for either the bulb 42 or lens 54. Various other means for imparting such movement will be apparent to one skilled in the art and are within the scope and breadth of the invention.

Fleas are believed to be more responsive to directly projected, focused light than to diffuse, broadly reflected light, whether because of light intensity or for other reasons. For this reason it is preferred that the reflector 26 have a shiny, mirror-like surface and that the lens 54 be clear and not diffusing. In any event, it is preferred that the light source 40 include means for horizontally directing the light of the light source 40 directly toward the fleas to be trapped rather than against a diffusing reflective surface or through a diffusing or translucent panel or lens. Nevertheless, all means for directing light from the open cover 18 substantially horizontally across the base 12 toward the area forward of the flea trap 10 are within the breadth and scope of the invention. The lens 54 may also be made of a green material to obtain the advantageous green light, referred to above.

It is desirable that the light bulb 42 be removably engaged in its socket so as to be replaceable. To facilitate bulb replacement, the lens 54 is made to be removable to allow easy access to the light bulb 42. Use of long lasting light sources, such as LEDs or even fluorescent bulbs, would make such accessibility less important. LEDs may even be molded within the lens 54.

The flea trap 10 is adapted for use with, and preferably includes, an insert tray 56, best seen in FIG. 2. The insert tray 56 is adapted to be removably inserted into the insert tray slot 24 though the insert port 28. The insert tray 56 has an upwardly exposed, generally centrally located tacky surface 58, preferably made by applying a coating of a suitable material directly to an appropriate surface of the insert tray or by adhering a coated paper or the like thereto. The tacky surface 58 is so located that, when the insert tray 56 is inserted within the insert tray slot 24, the tacky surface 58 is located beneath the tray slot window 26 and thus is in position to retain those fleas that are attracted to the flea trap 10 by the light source 40 and fall through the tray slot window. The grid 36 prevents access to the tacky surface 58 by children or pets and also visually screens the tacky surface somewhat.

The cover 18 includes a tray slot shield 60. The tray slot shield 60 extends forwardly from the top edge 22 of the cover 18, when the cover is in its open position. The tray slot shield 60 has several functions. When the cover 18 is its open position and the light source 40 is on, the tray slot shield 60 serves as a visor, at least partially shielding the light source 40 from the view of a person standing in a room when the flea trap 10 has been placed on the floor of the room. This light shielding effect is aesthetically desirable, making the presence of the flea trap 10 less attention-attracting, and also serves to screen the eyes of the viewer from irritating glare. The tray slot shield 60 also serves to reflect this screened light forwardly toward the floor or other surface on which the flea trap 10 has been placed. Thus, light that otherwise would have been dispersed high into the room, where fleas are less likely to be located, is directed instead toward parts of the room at a level with the flea trap, increasing the effective illumination of the light source 40 to those areas.

When the cover 18 is in its closed position, the tray slot shield 60 extends downwardly with respect to the base 12. Preferably the cover 18 has a length from its bottom to top edges 20 and 22 sufficient that, when the cover is in its closed position, the tray slot shield 60 extends downwardly in front of the front edge 14 of the base 12. When the insert port 28 opens forwardly, as is preferred, the tray slot shield 60 of the closed cover 18 thus obstructs access to the insert port. This arrangement prevents accidental loss of an insert tray 56 through the insert port 28 and thus is a convenient arrangement for shipping or for carrying the flea trap 10 from place to place.

Preferably the insert tray slot 24 includes keying structures that impart a cross-sectional profile to the insert tray slot that so restricts access thereinto as to prevent the insertion of any insert tray 56 not having a complementary cross-sectional profile. The keying structures preferably are not vertically symmetrical so that the insert tray 56 can be inserted only one way, with the tacky surface 58 presented upwardly under the tray slot window 26.

Figure 5:
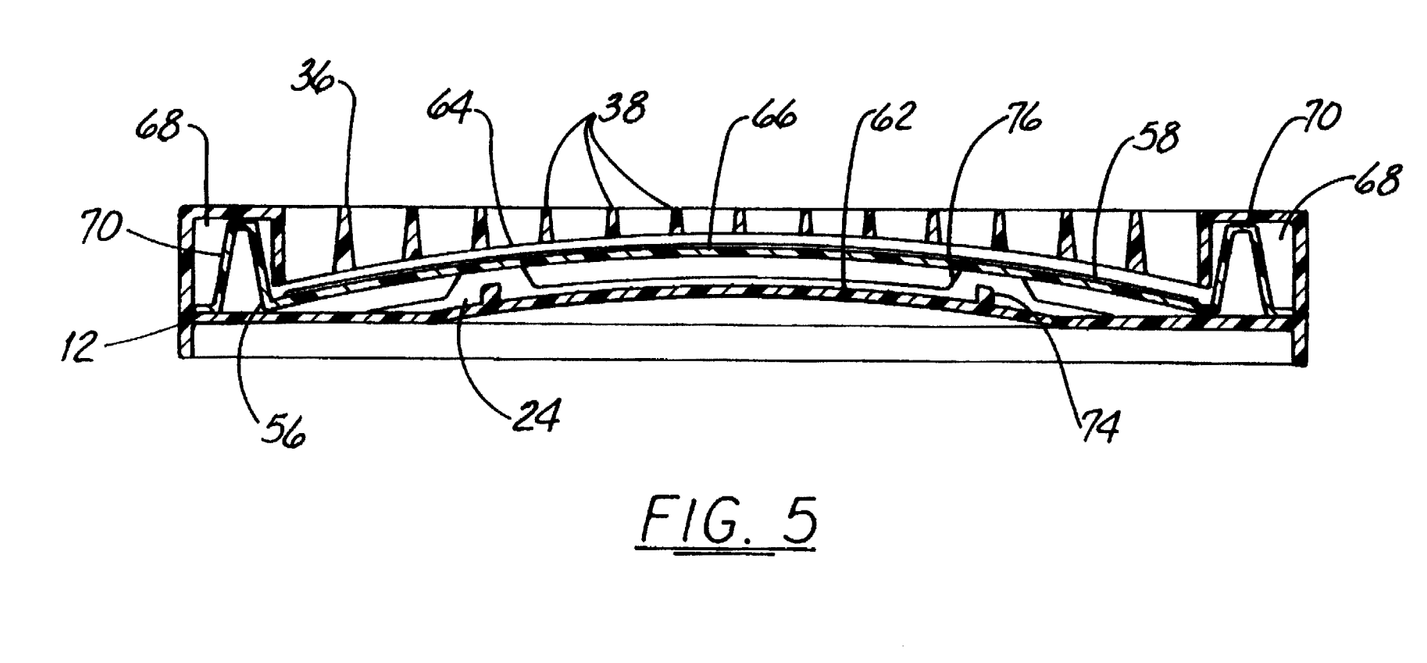
FIG. 5 is a cross-sectional view of the insert tray slot of the flea trap of FIG. 1, with an insert tray inserted therein, the cross-sectional view taken along section line 5—5 of FIG. 1.

Various arrangements of keying structures are easily imagined by one skilled in the art. However, in the preferred embodiment, at least a portion of the insert tray slot 24 is curved in lateral cross-section, as is illustrated in FIG. 5. It is preferred that such curve be upward, although downward or undulating curves are also within the scope and breadth of the invention. In the embodiment shown in FIG. 5, the insert tray slot 24 has an upwardly curving floor 62. Bottom surfaces of the grid 36 define a corresponding upwardly curved ceiling 64 of the insert tray slot 24. The insert tray 56 has a central panel 66 that curves upwardly to match the upwardly curving cross-sectional shape of the insert tray slot 24 as just described. Thus, the insert tray 56 can only be inserted within the insert tray slot 24 in one orientation.

In addition, in the preferred embodiment, the insert tray slot 24 has surfaces that define at least one and preferably two locator slots 68 that extend from the insert port 28 lengthwise with respect to the insert tray slot. In the preferred embodiment, as best seen in cross section in FIG. 5, the insert tray slot 24 includes a locator slot 68 at each side of the insert tray slot. The preferred insert tray 56 then includes at either side thereof a locator rib 70 extending upwardly from the edges of the central panel 66. Each locator rib 70 has a cross-sectional profile that complements that of the corresponding locator slot 68, so that the locator ribs can be received within the locator slots in sliding relation when the tray 56 is inserted through the insert port 28 into the insert tray slot 24. The interacting locator slots 68 and locator ribs 70 serve both as keying structures and also as means to guide and orient the insert tray 56 as it is inserted into the insert tray slot 24.

In the preferred embodiment of the insert tray 56, a stiffener rib 72 extends across the front of the insert tray, from side to side, extending upwardly from the central panel 66 and joined to the locator ribs 70 at their forward ends. The stiffener rib 72 has a central opening that provides a finger grip 73 that allows a user an easy way to grasp the insert tray 56 for insertion or removal from the insert tray slot 24 and makes most natural a grip on the insert tray 56 that will lead to a correct orientation of the tray for proper insertion. The combination of stiffener rib 72, locator ribs 70, and curved central panel 66 provides a rigid structure for the insert tray 56, allowing it to be manufactured economically out of thin materials. This allows the insert tray 56 to be made out of disposable paper or plastic materials that otherwise would be too limber for convenient use.

Other arrangements of keying structures will be apparent to those skilled in the art that would comparably achieve the primary goal of regulating the orientation of the insert tray 56 with respect to the insert tray slot and providing conveniently strong and stiff structures. For example, floor rib 74, shown in cross-section in FIG. 5, extending lengthwise with respect to the direction of insertion of the insert tray 56 on the upwardly curving floor 62 of the insert tray slot 24 can be included to stiffen the floor 62 and to key into a notch in the insert tray, such as that shown at 76 in FIG. 5. The notch 76 is of a size sufficient to avoid obstructing contact with the floor rib 74.

Figure 9:
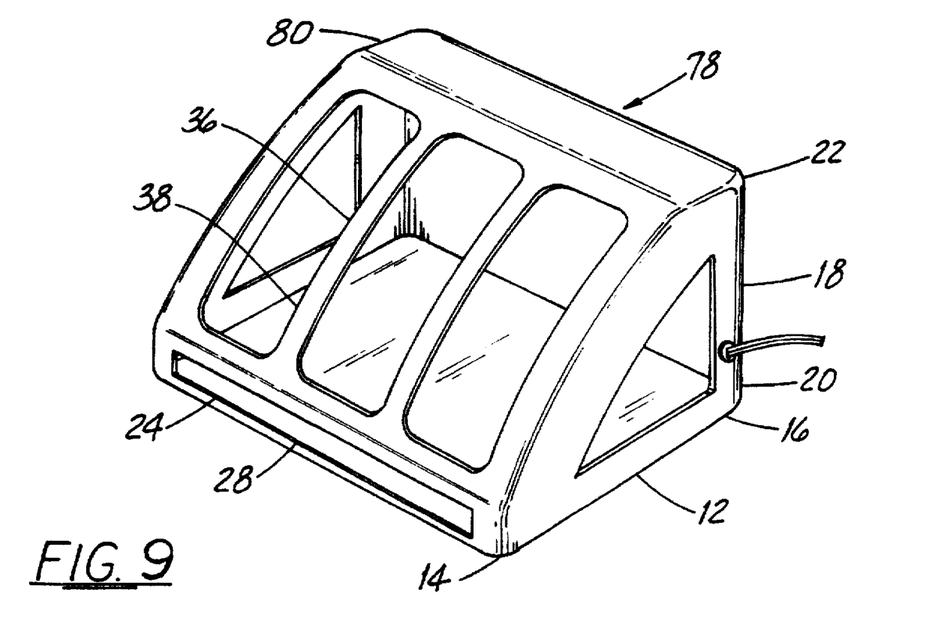
FIG. 9 is a perspective view of an alternative embodiment of the invention.

Although, in the preferred embodiment of the invention, the cover 18 is joined to the base 12 in jointed relation, as described above, the cover and base alternatively can be rigidly joined to each other, as is depicted in the embodiment shown generally at 78 in FIG. 9, with parts thereof that correspond to those of the embodiment shown at 10 in FIG. 1 being given like reference numbers. A grid 36 may be formed directly as a part of the base 12, as described above, or may be allowed to bridge from the front edge 14 of the base to a unitarily formed visor, corresponding in position and function to the tray slot shield 60, described above, when the cover 18 is in its open position. Such a unitarily formed visor is shown at 80 in FIG. 9. As will be apparent to one skilled in the art, the relative proportions of the base 12 and cover 18 shown may be varied to achieve aesthetic effects, manufacturing convenience, economy, or the like. The embodiment of the invention shown in FIG. 9 has advantages of economy of manufacture and, by omitting some of the moving parts of the embodiments previously described, advantages of simplicity and durability of structure. Depending on the relative importance of such advantages to one practicing the invention, the embodiment of FIG. 9 may even be ultimately preferred over others.

Nevertheless, various advantages of the embodiment of the invention shown at 10 in FIG. 1 also will be apparent. In the preferred embodiment described above, wherein the cover 18 may be folded down to lie parallel to and over the base 12, the flea trap 10 can both project a generally horizontally directed light beam when the cover is open and also be foldable into a compact configuration. The compact, folded configuration is convenient for efficient shipping and presentation on a store shelf. Furthermore, in the folded position, the insert tray 56 cannot be lost through the insert port 28 because of the effect of the tray slot shield 60. This arrangement increases the ease of temporary storage of the flea trap 10 or its movement from room to room. For that matter, a user of a flea trap 10 may desire to close the trap during the day or at other times when the user desires to screen the tacky surface 28 of the insert tray 56 from view or when the light source 40 would have reduced ability to attract fleas because of ambient light.

The advantageous arrangement of insert tray 56 and insert tray slot 24 disclosed above allows for the convenient removal of an insert tray covered with trapped fleas and replacement with a new tray with a fresh tacky surface 58. Because the insert tray 56 may be rigid and slides easily in and out of the insert tray slot 24, this operation may be achieved with ease and with no need to remove or otherwise deal with the grid 36 or to risk having to touch the tacky surface 58. Furthermore, the complementary cross sectional shapes of the insert tray 56 and the insert tray slot 24 ensure a reliably correct orientation of the insert tray as it is inserted within the insert tray slot. In this feature and elsewhere, the structures of the preferred embodiment of the flea trap 10 are made to interact in such a way that they serve multiple functions and achieve advantages not available without their combination.

Convenient materials and methods of manufacture of the flea trap of the invention will be apparent to one skilled in the art. The base 12, cover 18, and insert tray 56 all may be molded out of conventional plastics by conventional means. The tacky surface 58, reflector 46, and light source 40 may be made of conventional materials in conventional ways.

The method of trapping fleas of the invention includes a first step of placing a horizontally oriented tacky surface at the location at which fleas are to be trapped. Preferably, the tacky surface is formed upon the upwardly facing surface of a central panel of a substantially rigid insert tray. The insert tray is removably inserted within a base adapted to hold the insert tray and provide ready access to the tacky surface for fleas dropping from above.

The method further includes the step of projecting generally horizontally directed light from a selected light source, directing the light forward from the rearward edge of the tacky surface to illuminate the area in front of the tacky surface in order to attract fleas from that area toward the source of the light. Preferably, the light source has a reflector, lens, or other means to affirmatively direct substantially all of the light in the forward direction. The light source, either by means of such a lens, reflector, or otherwise, preferably also has a vertically oriented, forwardly facing illuminating surface that extends for substantially the width of the tacky surface.

By practice of the method of the invention, fleas are attracted by the light and jump toward the light source and onto the tacky surface or, alternatively, jump against the forwardly facing illuminating surface to bounce back therefrom onto the tacky surface. Fleas that come into contact with the tacky surface are held and consequently trapped by the tacky surface. When the tacky surface is formed upon the upwardly facing surface of a central panel of a substantially rigid insert tray, removably inserted within a base adapted to hold the insert tray, practice of the method further includes the disposing of fleas trapped on the tacky surface by removing and disposing of the insert tray.

Preferably, the base has a grid that extends over the tacky surface and prevents ready access to the tacky surface by children or pets. The base also has an edge and a horizontally extending insert tray slot that opens toward that edge so that the insert tray may be removably inserted within the insert tray slot. When the method of the invention is performed using such a base, the step of removing and disposing of the insert tray may be accomplished without opening, removing, or otherwise disturbing the grid.

Preferably the base with which the method of the invention is performed has a rear edge. The light source is located on a vertically extending cover having a lower edge. The cover is hingedly joined at its lower edge to the base at its rear edge so that the cover may be closed over the base, coveting the tacky surface of the insert tray. When performed with such a base and cover, the method of the invention includes the step of closing the cover for storage or transport of the base, insert tray, and cover.

It is preferred further that the method of the invention be performed with a base that has a front edge and an insert tray slot that opens toward that front edge, allowing the insert tray to be removably inserted into the base therethrough, and that the cover has a top edge and a tray slot shield that extends forwardly from the top edge when the cover is open and downwardly across the front edge of the base when the cover is closed. By this arrangement, access to the insert tray slot is restricted when the cover is closed. When performed with such a base and cover, the step referred to above of closing the cover for storage or transport of base, insert tray, and cover includes the retention of the insert tray within the base for so long as the cover is closed.

While a preferred form of the invention has been shown in the drawings and described, variations in the preferred form will be apparent to those skilled in the art. Similarly, variations in the method of the invention will be apparent to those skilled in the art. Consequently, the invention should not be construed as limited to the specific forms and steps shown and described. Instead, the invention should be understood in terms of the following claims:

What is claimed is:

1. A flea attracting device comprising a horizontally oriented base having a front and a rear edge, and a vertically oriented cover having a bottom and a top edge, the cover extending upwardly from the rear edge of the base, and the base extending forwardly from the bottom edge of the cover,
   a. the base having
      i. internal surfaces defining a substantially horizontal insert tray slot adapted to receive an insert tray,
      ii. an opening communicating upwardly through the base from the insert tray slot to define an upwardly-opening tray slot window, and iii. an opening communicating substantially horizontally through the base from the insert tray slot to define an insert port sufficiently large to allow the horizontal insertion and removal of an insert tray having a trapping means thereon through the insert port, and b. the cover having a light source whose light is suitable to attract fleas when directed substantially forwardly, across the base, toward the area in front of the flea trap.

2. The flea attracting device of claim 1 wherein the base includes a protective grid, the grid having spaced grid members that extend over the tray slot window, the grid members being spaced sufficiently close to each other as to restrict pet or child access through the tray slot window to the insert tray slot but sufficiently apart from each other as to allow fleas access to the insert tray slot.

3. The flea attracting device of claim 2 wherein the grid is non-removably incorporated into the base.

4. The flea attracting device of claim 1 further comprising an insert tray adapted to be removably inserted into the insert tray slot through the insert port, the insert tray having an upwardly exposed tacky surface to retain those fleas that are attracted to the flea attracting device by the light source and fall through the tray slot window to the tacky surface.

5. The flea attracting device of claim 1 wherein the rear edge of the base and bottom edge of the cover are joined to each other in jointed relation such that the cover may be moved by a user of the flea attracting device from an open position, wherein the cover extends approximately at a right angle to the base, to a closed position, wherein the cover extends generally parallel to the base to substantially cover the tray slot window.

6. The flea attracting device of claim 5 wherein the base and the cover are joined by a hinge.

7. The flea attracting device of claim 5 wherein one of the base and the cover has a joint slot and the other of the base and cover has a joint tab adapted to be reasonably retained within the joint slot, to provide the jointed relationship between the base and cover.

8. The flea attracting device of claim 5 wherein the insert port is forwardly opening, and the cover includes a tray slot shield extending forwardly from the top edge of the cover when the cover is in its open position and extending downwardly therefrom when the cover is in its closed position to obstruct access to the insert port to prevent accidental removal of an insert tray therethrough.

9. The flea attracting device of claim 1 wherein the insert tray slot includes keying structures that impart a cross-sectional profile to the insert tray slot that so restricts access thereinto as to prevent the insertion into the insert tray slot of any insert tray not having a complementary cross-sectional profile.

10. The flea attracting device of claim 9 wherein the insert tray slot is curved in lateral cross section so as to accept only insert trays that may be correspondingly curved in lateral cross section when inserted.

11. The flea attracting device of claim 10 wherein the insert tray slot has surfaces that define a locator slot extending lengthwise with respect to the insert tray slot to receive in sliding relation an insert tray locator rib of complementary cross-sectional profile extending lengthwise on the insert tray to guide and orient the insert tray as it is inserted into the insert tray slot.

12. The flea attracting device of claim 11 including an insert tray having a central floor having a curved lateral cross section corresponding to the lateral cross section of the insert tray slot to allow the insert tray to enter the insert tray slot and having an insert tray locator rib extending lengthwise with respect to the insert tray, the insert tray locator rib having a cross-sectional profile complementary to the cross-sectional profile of the locator slot.

13. The flea attracting device of claim 12 wherein a locator slot extends along each side of the insert tray slot and a locator rib corresponding to each locator slot and complementary in cross-sectional profile thereto extends along each side of the insert tray.

14. The flea attracting device of claim 1 wherein the light source of the cover includes a light bulb and means to direct electricity thereto and a reflector to direct the light bulb's light forwardly.

15. The flea attracting device of claim 14 further including temperature responsive means to interrupt the flow of electricity to the bulb when the temperature of the flea attracting device exceeds a selected critical temperature.

16. The flea attracting device of claim 1 wherein the light source of the cover faces forwardly, toward the base, the light source including a light bulb and means to direct electricity thereto and a lens located forward of the light bulb and extending from side to side of the cover for substantially the width of the tray slot window.

17. The flea attracting device of claim 1 wherein the light source includes means for sweeping the target area with light.

18. A flea attracting device comprising a horizontally oriented base having a front and a rear edge, and a vertically oriented cover having a bottom and a top edge, the cover extending upwardly from the rear edge of the base, and the base extending forwardly from the bottom edge of the cover, a. the base having internal surfaces defining a substantially horizontal insert tray slot adapted to receive an insert tray having a trapping means thereon, the insert tray slot having an open top defining a tray slot window and access means for the insertion and removal of an insert tray in the insert tray slot, and b. the cover having a light source suitable to attract fleas with means to direct the light substantially forwardly, across the base, toward the area in front of the flea trap.

19. The flea attracting device of claim 18 wherein the base includes a protective grid, the grid having spaced grid members that extend over the tray slot window, the grid members being spaced sufficiently close to each other as to restrict pet or child access through the tray slot window to the insert tray slot but sufficiently apart from each other as to allow fleas access to the insert tray slot.

20. The flea attracting device of claim 19 wherein the grid is non-removably incorporated into the base.

21. The flea attracting device of claim 18 further comprising an insert tray adapted to be removably inserted into the insert tray slot, the insert tray having an upwardly exposed tacky surface to retain those fleas that are attracted to the flea attracting device by the light source and fall through the tray slot window to the tacky surface.

22. The flea attracting device of claim 18 wherein the rear edge of the base and bottom edge of the cover are joined to each other in jointed relation such that the cover may be moved by a user of the flea attracting device from an open position, wherein the cover extends approximately at a right angle to the base, to a closed position, wherein the cover extends generally parallel to the base to substantially cover the tray slot window.

23. The flea attracting device of claim 22 wherein the base and the cover are joined by a hinge.

24. The flea attracting device of claim 22 wherein one of the base and the cover has a joint slot and the other of the base and cover has a joint tab adapted to be reasonably retained within the joint slot, to provide the jointed relationship between the base and cover.

25. The flea attracting device of claim 22 wherein the access means for the insertion and removal of an insert tray in the insert tray slot includes a forwardly opening insert port sufficiently large to allow insertion and removal of an insert tray therethrough, the insert port being located at the front edge of the base, and the cover includes a tray slot shield extending forwardly from the top edge of the cover when the cover is in its open position and extending downwardly therefrom when the cover is in its closed position to obstruct access to the insert port to prevent accidental removal of an insert tray therethrough.

26. The flea attracting device of claim 18 wherein the insert tray slot includes keying structures that impart a cross-sectional profile to the insert tray slot that so restricts access thereinto as to prevent the insertion into the insert tray slot of any insert tray not having a complementary cross-sectional profile.

27. The flea attracting device of claim 26 wherein the insert tray slot is curved in lateral cross section so as to accept only insert trays that may be correspondingly curved in lateral cross section when inserted.

28. The flea attracting device of claim 27 wherein the insert tray slot has surfaces that define a locator slot extending lengthwise with respect to the insert tray slot to receive in sliding relation an insert tray locator rib of complementary cross-sectional profile extending lengthwise on the insert tray to guide and orient the insert tray as it is inserted into the insert tray slot.

29. The flea attracting device of claim 28 including an insert tray having a central floor having a curved lateral cross section corresponding to the lateral cross section of the insert tray slot to allow the insert tray to enter the insert tray slot and having an insert tray locator rib extending lengthwise with respect to the insert tray, the insert tray locator rib having a cross-sectional profile complementary to the cross-sectional profile of the locator slot.

30. The flea attracting device of claim 29 wherein a locator slot extends along each side of the insert tray slot and a locator rib corresponding to each locator slot and complementary in cross-sectional profile thereto extends along each side of the insert tray.

31. The flea attracting device of claim 18 wherein the light source of the cover faces forwardly, toward the base, the light source including a light bulb and means to direct electricity thereto and a reflector to direct the light bulb's light forwardly.

32. The flea attracting device of claim 31 further including temperature responsive means to interrupt the flow of electricity to the bulb when the temperature of the flea attracting device exceeds a selected critical temperature.

33. The flea attracting device of claim 18 wherein the light source of the cover faces forwardly, toward the base, the light source including a light bulb and means to direct electricity thereto and a lens located forward of the light bulb and extending from side to side of the cover for substantially the width of the tray slot window.

34. The flea attracting device of claim 18 wherein the light source includes means for sweeping the target area with light.

35. A flea trap comprising a horizontally oriented base having a front and a rear edge, a vertically oriented cover having a bottom and a top edge, and an insert tray, the cover extending upwardly from the rear edge of the base, and the base extending forwardly from the bottom edge of the cover, a. the base having
 i. internal surfaces defining a substantially horizontal insert tray slot adapted to receive an insert tray,
 ii. an opening communicating upwardly through the base from the insert tray slot to define an upwardly-opening tray slot window,
 iii. an opening communicating substantially horizontally through the base from the insert tray slot to define an insert port sufficiently large to allow the horizontal insertion and removal of an insert tray through the insert port, and;
 iv. a protective grid, the grid having spaced grid members that extend over the tray slot window, the grid members being spaced sufficiently close to each other as to restrict pet or child access through the grid to the insert tray slot but sufficiently apart from each other as to allow fleas access to the insert tray slot;
b. the cover having a light source whose light is directed substantially forwardly, across the base, toward the area in front of the flea trap, the rear edge of the base and bottom edge of the cover being joined to each other in jointed relation such that the cover may be moved by a user of the flea trap from an open position, wherein the cover extends approximately at a right angle to the base, to a closed position, wherein the cover extends generally parallel to the base to substantially cover the tray slot window, and
c. the insert tray having an upwardly exposed tacky surface to retain those fleas that are attracted to the flea trap by the light source and fall through the tray slot window to the tacky surface.

36. A method of trapping fleas comprising the steps of:
a. placing a horizontally oriented tacky surface at the location at which the fleas are to be trapped, and
b. projecting generally horizontally directed light from a selected light source, forwardly from the rearward edge of the tacky surface, to illuminate the area in front of the tacky surface in order to attract fleas from that area toward the source of the light, the light source having a vertically oriented, forwardly facing illuminating surface that extends for substantially the width of the tacky surface, whereupon fleas attracted by the light will jump toward the light source and onto the tacky surface or will jump against the forwardly facing illuminating surface to bounce back therefrom onto the tacky surface, to be held and so trapped by the tacky surface, and wherein the tacky surface is formed upon the upwardly facing surface of a central panel of a substantially rigid insert tray, and the insert tray is removably inserted within a base adapted to hold the insert tray and provide ready access to the tacky surface for fleas dropping from above, whereupon the method includes the step of disposing of fleas trapped on the tacky surface by removing and disposing of the insert tray.

37. The method of claim 36 wherein the base has a grid that extends over the tacky surface and prevents ready access by children or pets to the tacky surface, the base further having an edge and a horizontally extending insert tray slot that opens toward that edge, within which insert tray slot the insert tray may be removably inserted, whereupon the step of removing and disposing of the insert tray may be accomplished without opening, removing, or otherwise disturbing the grid.

38. The method of claim 36 wherein the base has a rear edge and the light source is located within a vertically extending cover having a lower edge, the cover being hingedly joined at its lower edge to the rear edge of the base so that the cover may be closed over the base to cover the tacky surface of the insert tray, whereupon the method includes the step of closing the cover for storage or transport of the base, insert tray, and cover.

39. The method of claim 38 wherein the base has a front edge and an insert tray slot that opens toward the front edge of the base so that the insert tray may be removably inserted into the base therethrough; and the cover has a top edge and a tray slot shield that extends forwardly from the top edge when the cover is open and downwardly across the front edge of the base when the cover is closed, restricting access to the insert tray slot, whereupon the step of closing the cover for storage or transport of the base, insert tray, and cover includes retaining the insert tray within the base for so long as the cover is closed.

40. An insert tray for removable insertion into an insert tray slot that has keying structures that impart a cross-sectional profile to the insert tray slot to restrict access thereinto, the insert tray comprising structures that define a cross-sectional profile complementary to that of the insert tray slot, including a curved central panel having an upwardly, substantially exposed tacky surface and an upwardly directed locator rib;

wherein the locator rib is adapted to interfit with a slot that is part of the tray slot, in a slidable connection.

41. An insert tray for removable insertion into an insert tray slot that has keying structures that impart a cross-sectional profile to the insert tray slot to restrict access thereinto, the insert tray comprising structures that define a cross-sectional profile complementary to that of the insert tray slot, including a curved central panel having an upwardly, openly exposed tacky surface;

wherein the insert tray slot is curved in lateral cross-section and includes a locator slot at each side thereof adapted to receive a locator rib of the insert tray in sliding relation thereto, the insert tray having a locator rib projecting upwardly from the central panel at each side thereof at locations corresponding to the locations of the locator slots, the locator ribs extending lengthwise with respect to the direction of insertion of the insert tray.

42. The insert tray of claim 41 wherein the insert tray includes a stiffener rib located at one end of the central panel and extending between the locator ribs laterally with respect to the direction of insertion of the insert tray, the stiffener rib being attached to the central panel and to each of the locator ribs.

43. The insert tray of claim 42 wherein the insert tray slot has a floor with an upwardly projecting floor rib extending lengthwise with respect to the direction of insertion of the insert tray, thereby contributing to the cross-sectional profile of the insert tray slot, the insert tray including surfaces defining a notch having a cross-sectional profile sufficient to allow the insert tray to be inserted into the insert tray slot without any obstructing contact with the floor rib.

44. An insert tray for removable insertion into an insert tray slot that has keying structures that impart a cross-sectional profile to the insert tray slot to restrict access thereinto, including a locator slot at a selected location therein adapted to receive a locator rib of the insert tray in sliding relation thereto, the insert tray comprising structures that define a cross-sectional profile complementary to that of the insert tray slot, including a curved central panel having an upwardly exposed tacky surface and a locator rib extending lengthwise with respect to the direction of insertion of the insert tray.

* * * * *